United States Patent
Wang et al.

(10) Patent No.: US 7,131,927 B2
(45) Date of Patent: Nov. 7, 2006

(54) COAXIAL-TYPE DIFFERENTIAL TRANSMISSION APPARATUS

(75) Inventors: Shih-Ming Wang, Taipei (TW); Ren-Jeng Wang, Chiayi (TW)

(73) Assignee: Chung Yuan Christian University, Taoyuan County (TW)

( * ) Notice: Subject to any disclaimer, the term of this patent is extended or adjusted under 35 U.S.C. 154(b) by 164 days.

(21) Appl. No.: 11/006,174

(22) Filed: Dec. 7, 2004

(65) Prior Publication Data

US 2005/0261103 A1   Nov. 24, 2005

(30) Foreign Application Priority Data

May 19, 2004   (TW) ............................... 93114071 A

(51) Int. Cl.
*F16H 3/44*   (2006.01)
(52) U.S. Cl. ..................................... 475/298
(58) Field of Classification Search ................ 475/300, 475/298
See application file for complete search history.

(56) References Cited

U.S. PATENT DOCUMENTS

| 978,159 A | * | 12/1910 | Henriod ...................... 475/288 |
| 1,623,213 A | * | 4/1927 | Starr ........................... 475/277 |
| 2005/0261106 A1 | * | 11/2005 | Wang et al. ................. 475/339 |

OTHER PUBLICATIONS

"Robot Analysis: The Mechanics of Serial and Parallel Manipulators" Tsai.
"Kinematics and Dynamics of Machinery" Wilson et al.

* cited by examiner

*Primary Examiner*—Dirk Wright
(74) *Attorney, Agent, or Firm*—Thomas, Kayden, Horstemeyer & Risley

(57) ABSTRACT

A coaxial-type differential transmission apparatus. A fixed gear fixed on a base. An intermediate member is adjacent to the fixed gear. An input shaft is rotatably fitted in the base and fixed gear and is fixed on the intermediate member. An output shaft is rotatably adjacent to the input shaft and is coaxial thereto. A reduction gear and an acceleration gear are slidably disposed on the output shaft. The acceleration gear is between the reduction gear and the intermediate member. A shifting device is disposed on the base and output shaft. A transmission shaft is rotatably fitted in the intermediate member. A first gear is fixed on the transmission shaft and is adjacent to the intermediate member. A second gear is fixed on the transmission shaft. A third gear is fixed on the transmission shaft and between the second gear and the intermediate member.

8 Claims, 5 Drawing Sheets

COAXIAL-TYPE DIFFERENTIAL TRANSMISSION APPARATUS

BACKGROUND

The invention relates to a coaxial-type differential transmission apparatus, and in particular to a coaxial-type differential transmission apparatus providing reduction and acceleration output functions.

A gear reduction mechanism is commonly used in power transmission devices. A gear reduction mechanism can reduce rotational speed of a power source, such as a motor or an engine, and thereby increase torque output therefrom.

To obtain a high reduction ratio, a conventional gear reduction mechanism requires multiple corresponding gear sets integrated with complex components. Moreover, since the conventional gear reduction mechanism requires a complicated housing to accommodate the gear sets and complex components, the size or volume thereof is inevitably large. The total weight of the conventional gear reduction mechanism is thus increased, causing inconvenience when employed in mechanical devices requiring reduction output.

Additionally, the conventional gear reduction mechanism presents the following drawbacks. Manufacture, processing, and assembly of components can be complicated, and material for components is not easily obtained. Further, integration of multiple gear sets incurs loss of power transmission among gears, backlash between gears, and assembly or accumulated errors can directly affect operative precision of the conventional gear reduction mechanism.

Moreover, in the conventional gear reduction mechanism, a belt is connected to a flywheel (or a metal disk) to transmit power from the motor or engine to the periphery thereof, rotating the flywheel (metal disk). The conventional gear reduction mechanism can then perform power output by means of an output shaft. Accordingly, since an input shaft (rotating shaft of the motor or engine) is not coaxial to the output shaft, vibration can be easily generated in the conventional gear reduction mechanism, causing partial loss of power transmitted to the flywheel (metal disk) thereof.

Hence, there is a need to provide a highly efficient coaxial-type differential transmission apparatus providing a high reduction and acceleration ratio and reducing vibration and loss of power resulting therefrom.

SUMMARY

Accordingly, a coaxial-type differential transmission apparatus of an embodiment of the invention comprises a base, a fixed gear, an intermediate member, an input shaft, an output shaft, a reduction gear, an acceleration gear, a shifting device, at least one transmission shaft, at least one first gear, at least one second gear, and at least one third gear. The fixed gear is fixed on the base. The intermediate member is adjacent to the fixed gear. The fixed gear is disposed between the base and the intermediate member. The input shaft is rotatably fitted in the base and fixed gear and is fixed on the intermediate member. The output shaft is rotatably adjacent to the input shaft and coaxial thereto. The reduction gear is slidably disposed on the output shaft. The acceleration gear is slidably disposed on the output shaft and connected to the reduction gear. The acceleration gear is disposed between the reduction gear and the intermediate member. The shifting device is disposed on the base and output shaft to adjust the position of the reduction and acceleration gears on the output shaft, adjusting rotational speed of the output shaft. The transmission shaft is rotatably fitted in the intermediate member. The first gear is fixed on the transmission shaft and is adjacent to the intermediate member. The first gear engages the fixed gear. The second gear is fixed on the transmission shaft. The reduction gear selectively engages the second gear by means of the shifting device. The third gear is fixed on the transmission shaft and between the second gear and the intermediate member. The acceleration gear selectively engages the third gear by means of the shifting device.

The coaxial-type differential transmission apparatus further comprises a sleeve slidably disposed on the output shaft. The reduction and acceleration gears are fixed on the sleeve and the shifting device is disposed on the base and sleeve.

The sleeve further comprises an engaging groove and the output shaft further comprises an engaging portion. The sleeve slides on the output shaft by the engaging groove sliding on the engaging portion.

The shifting device further comprises a clamping member, a fixing member, a sliding member, and an adjusting rod. The clamping member is fixed on the sleeve and comprises a sliding groove. The fixing member is fixed on the base. The sliding member is slidably disposed in the sliding groove and is connected to the adjusting rod by means of the fixing member.

The base further comprises a first sidewall and a second sidewall opposite thereto. The fixed gear is fixed on the first sidewall and between the first sidewall and the intermediate member. The input shaft is rotatably fitted in the first sidewall and fixed gear. The output shaft is rotatably fitted in the second sidewall. The shifting device is disposed on the second sidewall and output shaft.

The fixed, reduction, acceleration, first, second, and third gears are spur gears.

The fixed, reduction, acceleration, first, second, and third gears have the same modulus.

The first and second gears have the same number of teeth. The fixed and reduction gears have the same pitch circle. The number of teeth of the fixed gear is different from that of the reduction gear by one.

A detailed description is given in the following embodiments with reference to the accompanying drawings.

BRIEF DESCRIPTION OF THE DRAWINGS

Embodiments of the invention can be more fully understood by reading the subsequent detailed description and examples with references made to the accompanying drawings, wherein.

DETAILED DESCRIPTION

Figure 1:
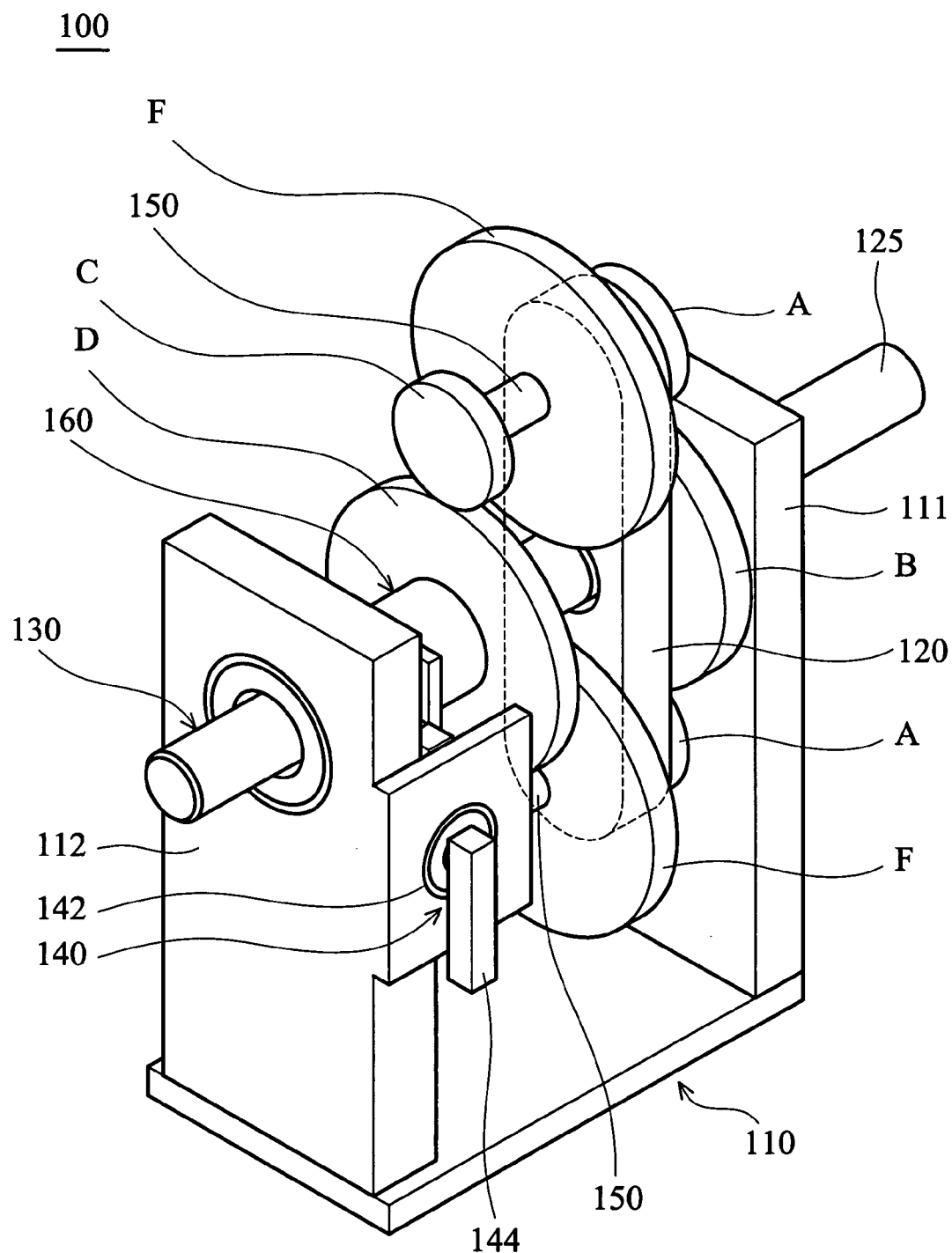
FIG. 1 is a perspective assembly view of a coaxial-type differential transmission apparatus according to an embodiment of the invention, wherein a partial intermediate member is omitted.
Figure 2:
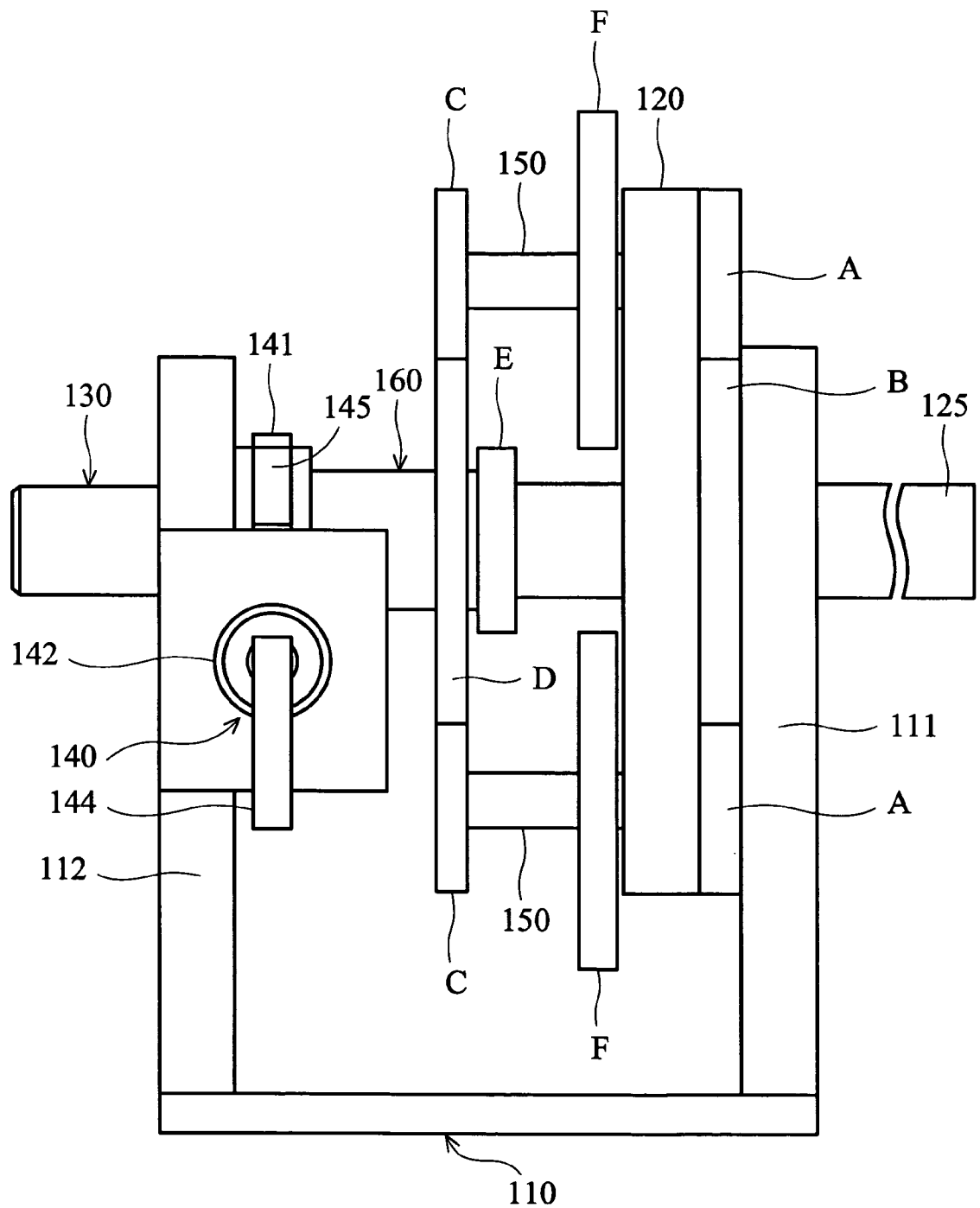
FIG. 2 is a schematic plane view of the coaxial-type differential transmission apparatus in a reduction output condition.

Referring to FIG. 1 and FIG. 2, the coaxial-type differential transmission apparatus 100 comprises a base 110, a fixed gear B, an intermediate member 120, an input shaft 125, an output shaft 130, a reduction gear D, an acceleration gear E, a shifting device 140, two transmission shafts 150, a sleeve 160, two first gears A, two second gears C, and two third gears F.

As shown in FIG. 1 and FIG. 2, the base 110 comprises a first sidewall 111 and a second sidewall 112 opposite thereto. The fixed gear B is fixed on the first sidewall 111 of the base 110. The intermediate member 120 is adjacent to the fixed gear B. Specifically, the fixed gear B is between the first sidewall 111 and the intermediate member 120. The input shaft 125 is rotatably fitted in the first sidewall 111 of the base 110 and fixed gear B. The input shaft 125 is connected to and fixed on the intermediate member 120. The input shaft 125 can be connected to a rotating shaft (not shown) of a motor or an engine. Thus, when the motor or engine operates to generate power, the intermediate member 120 can rotate by means of the input shaft 125.

The output shaft 130 is rotatably fitted in the second sidewall 112 of the base 110 and is adjacent to the input shaft 125. Specifically, the output shaft 130 is coaxial to the input shaft 125. Namely, the output shaft 130 is coaxially adjacent to the input shaft 125.

Figure 5:
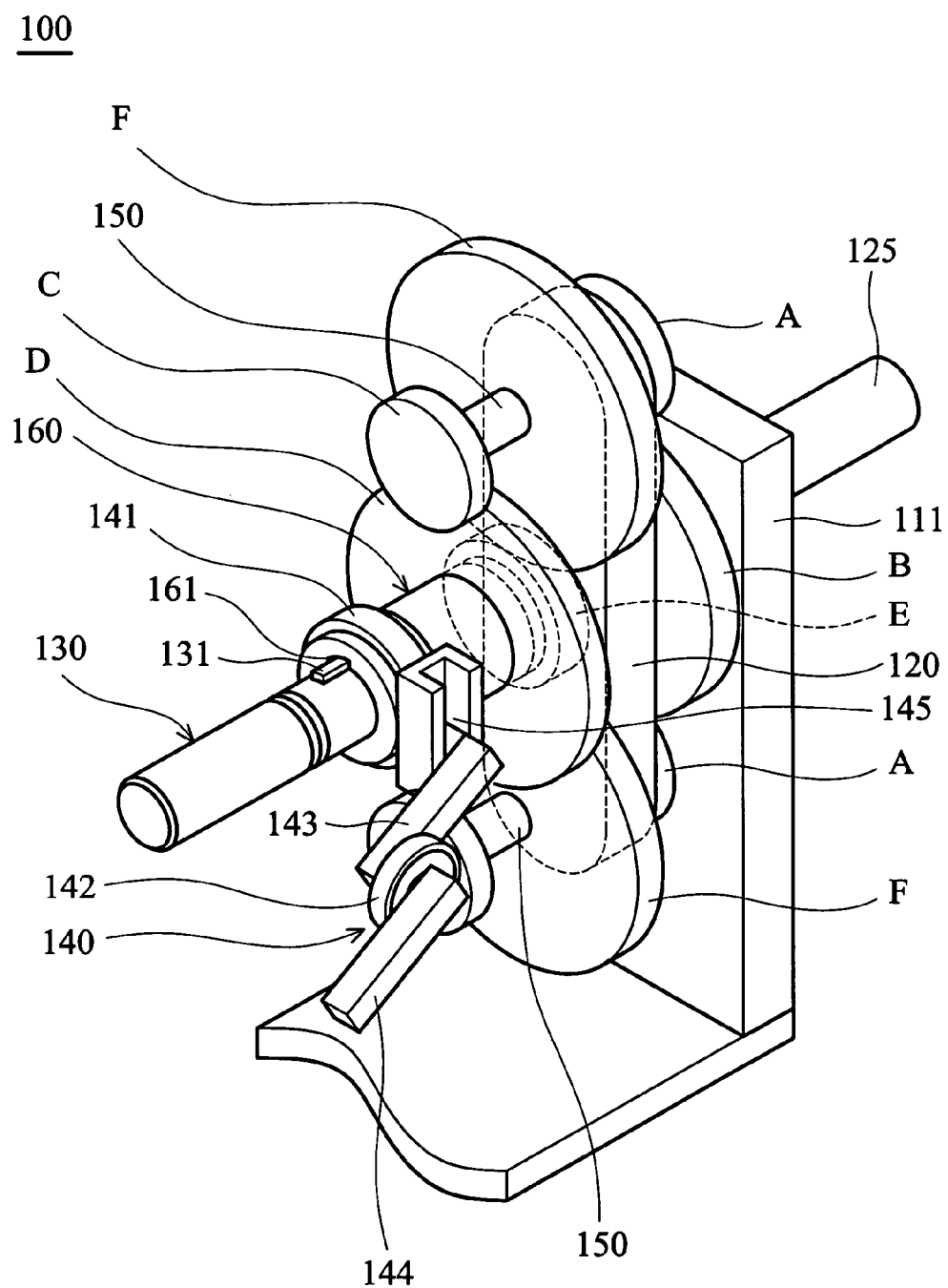
FIG. 5 is a partial perspective view of the coaxial-type differential transmission apparatus in an accelerated output condition.

The sleeve 160 is horizontally and slidably disposed on the output shaft 130. As shown in FIG. 5, the sleeve 160 comprises an engaging groove 161 and the output shaft 130 comprises an engaging portion 131 formed thereon. The sleeve 160 can slide horizontally on the output shaft 130 by the engaging groove 161 sliding on the engaging portion 131.

The reduction gear D is connected to the acceleration gear E and the acceleration gear E is disposed between the reduction gear D and the intermediate member 120. Specifically, the reduction gear D and acceleration gear E are fixed on the sleeve 160. Thus, when the sleeve 160 slides horizontally on the output shaft 130, the reduction gear D and acceleration gear E slide horizontally therewith.

Figure 4:
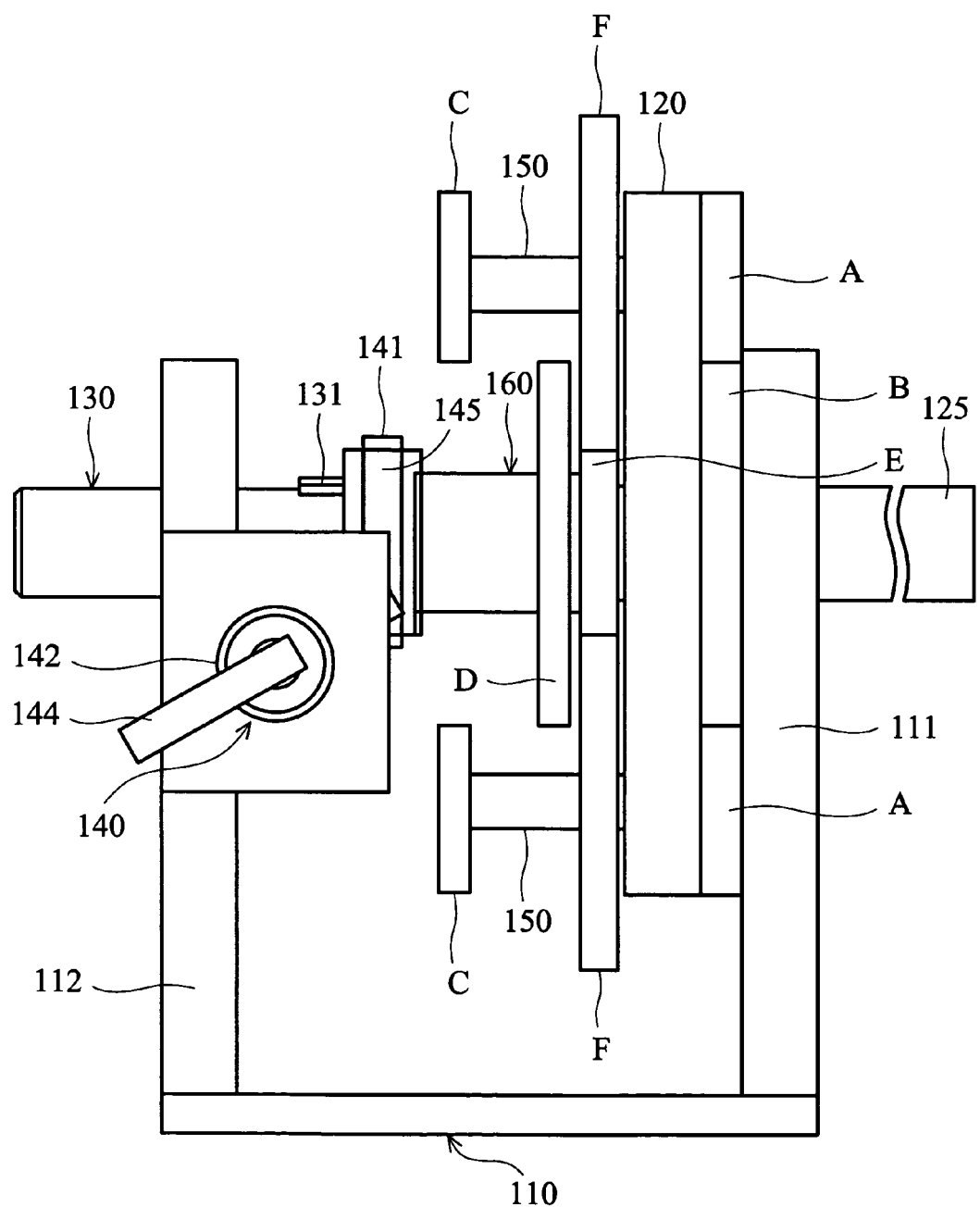
FIG. 4 is a schematic plane view of the coaxial-type differential transmission apparatus in an accelerated output condition.

The transmission shafts 150 are symmetrical to the output shaft 130 (or input shaft 125) and rotatably fitted in the intermediate member 120. The first gears A are respectively fixed on the transmission shafts 150 and adjacent to the intermediate member 120. Additionally, the first gears A simultaneously engage the fixed gear B. The second gears C and third gears F are fixed on the transmission shafts 150, respectively. Specifically, each third gear F is disposed between each second gear C and the intermediate member 120. Thus, the first gears A and fixed gear B form an epicyclic (planetary) gear set, as shown in FIG. 2 and FIG. 4. Moreover, the second gears C and reduction gear D can selectively form an epicyclic (planetary) gear set (as shown in FIG. 2), and the third gears F and acceleration gear E can selectively form an epicyclic (planetary) gear set (as shown in FIG. 4).

Figure 3:
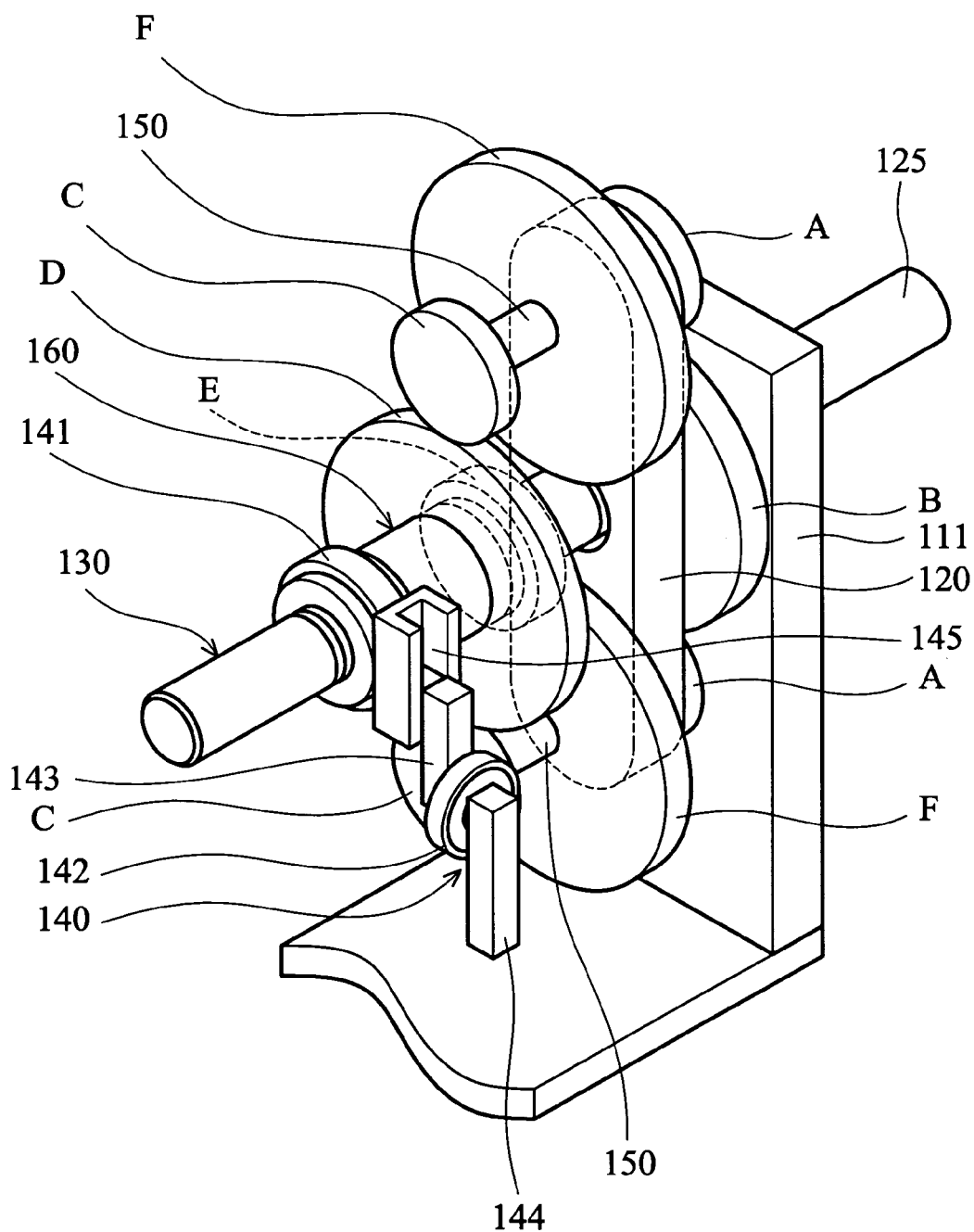
FIG. 3 is a partial perspective view of the coaxial-type differential transmission apparatus in a reduction output condition.

The shifting device 140 is disposed on the second sidewall 112 of the base 110 and on the output shaft 130 (sleeve 160). As shown in FIGS. 2, 3, and 5, the shifting device 140 comprises a clamping member 141, a fixing member 142, a sliding member 143, and an adjusting rod 144. The clamping member 141 is fixed on the sleeve 160 and comprises a sliding groove 145. The fixing member 142 is fixed on the second sidewall 112 of the base 110. The sliding member 143 is slidably disposed in the sliding groove 145 and is connected to the adjusting rod 144 by means of the fixing member 142. When pushed upward in a clockwise direction, as shown in FIG. 2 and FIG. 4, the adjusting rod 144 of the shifting device 140 forces the sliding member 143 downward in the sliding groove 145 of the clamping member 141, as shown in FIG. 3 and FIG. 5. At this point, because the sleeve 160 is limited by the fixing member 142 and second sidewall 112 and the clamping member 141 is fixed on the sleeve 160, the sleeve 160 is pushed rightward to allow the acceleration gear E thereon to engage the third gears F, as shown in FIG. 4. Accordingly, by operation of the shifting device 140, the positions of the reduction gear D and acceleration gear E on the output shaft 130 can be adjusted or changed. Namely, the reduction gear D can selectively engage the second gears C by the operation of the shifting device 140 to form an epicyclic (planetary) gear set. Similarly, the acceleration gear E can selectively engage the third gears F by the operation of the shifting device 140 to form another epicyclic (planetary) gear set.

Additionally, in the coaxial-type differential transmission apparatus 100, the fixed gear B, reduction gear D, acceleration gear E, first gears A, second gears C, and third gears F are spur gears having the same modulus.

To achieve superior reduction (1/360 or lower), the coaxial-type differential transmission apparatus 100 employs the differential characteristic provided by shifted gears and properly allocates the number of teeth of the aforementioned gears. Accordingly, the number of teeth Na of each first gear A is the same as the number of teeth Nc of each second gear C. The fixed gear B and reduction gear D have the same pitch circle. Specifically, the number of teeth Nb of the fixed gear B differs from the number of teeth Nd of the reduction gear D by one.

Moreover, the number of teeth Nd of the reduction gear D exceeds the number of teeth Ne of the acceleration gear E and number of teeth Nc of each second gear C. The number of teeth Ne of the acceleration gear E is fewer than the number of teeth Nf of each third gear F.

The following description is directed to (reduction) operation of the coaxial-type differential transmission apparatus 100.

As shown in FIG. 2, when the adjusting rod 144 of the shifting device 140 is pushed downward, the second gears C engage the reduction gear D. The intermediate member 120 can then rotate by means of the input shaft 125, such that the coaxial-type differential transmission apparatus 100 performs reduction output. The fixed gear B is fixed on the first sidewall 111 of the base 110 and is thereby stationary. The transmission shafts 150 are rotatably fitted in the intermediate member 120. The first gears A and second gears C are respectively fixed on the transmission shafts 150. When the intermediate member 120 rotates, the transmission shafts 150 rotate around the fixed gear B. Since the first gears A engage the stationary fixed gear B, each first gear A rotates around its central axis and around the fixed gear B. When each first gear A self-rotates with a displacement angle per tooth (360/Na), each transmission shaft 150 also rotates around the fixed gear B with the same displacement angle per tooth (360/Nb). Since the first gears A and second gears C are respectively fixed on the same transmission shafts 150, each second gear C also self-rotates with the same displacement angle per tooth (360/Na). Since Na equals Nc, 360/Na equals 360/Nc. Moreover, each transmission shaft 150 rotates around the reduction gear D with the displacement angle per tooth (360/Nb). Each transmission shaft 150, however, must rotate around the reduction gear D with another displacement angle per tooth (360/Nd). Accordingly, Nb is not equal to Nd. To equalize the displacement angles per tooth with which each transmission shaft 150 rotates around the fixed gear B and reduction gear D due to conservation of the displacement angle, each second gear C timely pushes the reduction gear D when rotating around its central axis and around the reduction gear D, thereby causing slight rotation of the reduction gear D.

Accordingly, when each first gear A rotates around the fixed gear B with one tooth, the first gear A rotates around its central axis with an angle of 360/Na and each transmission shaft 150 rotates around the fixed gear B with an angle of 360/Nb. Since the first gears A and second gears C are respectively fixed on the same transmission shafts 150, each second gear C rotates around its central axis with an angle of 360/Na and each transmission shaft 150 rotates around the reduction gear D with the angle of 360/Nb. The angle of 360/Na with which the second gear C rotates around its central axis indicates that the second gear C engages the reduction gear D with a number of teeth of 360/Na×Nc/360. Further, each transmission shaft 150 rotates around the reduction gear D with an angle of 360/Na×Nc/360×360/Nd. Each transmission shaft 150, however, must rotate around the reduction gear D with the angle of 360/Nb. To comply with the conservation 10 of the displacement angle, the difference between the rotating angles of 360/Nb and 360/Na×Nc/360×360/Nd of each transmission shaft 150 is compensated or balanced by rotation of the reduction gear D. Accordingly, the reduction gear D rotates around its central axis with an is angle of 360/Nb−(360/Na×Nc/360×360/Nd). Thus, the proportion of output rotational speed to input rotational speed of the coaxial-type differential transmission apparatus 100 is:

$$(360/Nb)-(360/Na\times Nc/360\times 360/Nd)/(360/Nb)=1-(Nc\times Nb/Na\times Nd).$$

Specifically, since the number of teeth Nb of the fixed gear B is different from the number of teeth Nd of the reduction gear D by one, the fixed gear B and reduction gear D may rotate in the same direction or in opposite directions when the intermediate member 120 rotates. The aforementioned two conditions depend on whether Nb is greater than Nd or Nd is greater than Nb.

In another aspect, as shown in FIG. 4, when the adjusting rod 144 of the shifting device 140 is pushed upward and clockwise, the third gears F engage the acceleration gear E. The intermediate member 120 can then rotate, such that the coaxial-type differential transmission apparatus 100 performs accelerated output. Since operation of the accelerated output of the coaxial-type differential transmission apparatus 100 is similar to that of the reduction output thereof, the description thereof is omitted for simplicity.

To conclude, embodiments of the coaxial-type differential transmission apparatus of the invention provide simplified manufacture and assembly, improved precision control, and reduced size and accumulated errors. Since the coaxial-type differential transmission apparatus employs the epicyclic (planetary) gear sets, better balance among the gears can be obtained and pressure exerted on the teeth of the gears can be reduced, thus eliminating axial force caused by loading exerted on the tooth faces of the gears. Since the upper and lower driving gears (second gears C or third gears F) simultaneously drive the passive gear (reduction gear D or acceleration gear E) to rotate, backlash problems generated during reversed rotation of the driving gears can be eliminated. The coaxial-type differential transmission apparatus can selectively provide reduction or accelerated output by means of the shifting device. Moreover, vibration resulting from the non-coaxial relationship of the input shaft to the output shaft can be greatly reduced. Thus, power transmitted into the coaxial-type differential transmission apparatus can be fully utilized.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A coaxial-type differential transmission apparatus, comprising:
   a base;
   a fixed gear fixed on the base;
   an intermediate member adjacent to the fixed gear, wherein the fixed gear is disposed between the base and the intermediate member;
   an input shaft rotatably fitted in the base and fixed gear and fixed on the intermediate member;
   an output shaft rotatably adjacent to the input shaft and coaxial thereto;
   a reduction gear slidably disposed on the output shaft;
   an acceleration gear slidably disposed on the output shaft and connected to the reduction gear, wherein the acceleration gear is disposed between the reduction gear and the intermediate member;
   a shifting device disposed on the base and output shaft to adjust position of the reduction and acceleration gears on the output shaft, adjusting rotational speed of the output shaft;
   at least one transmission shaft rotatably fitted in the intermediate member;
   at least one first gear fixed on the transmission shaft and adjacent to the intermediate member, wherein the first gear engages the fixed gear;
   at least one second gear fixed on the transmission shaft, wherein the reduction gear selectively engages the second gear by means of the shifting device; and
   at least one third gear fixed on the transmission shaft and between the second gear and the intermediate member, wherein the acceleration gear selectively engages the third gear by means of the shifting device.

2. The coaxial-type differential transmission apparatus as claimed in claim 1, further comprising a sleeve slidably disposed on the output shaft, wherein the reduction and acceleration gears are fixed on the sleeve and the shifting device is disposed on the base and sleeve.

3. The coaxial-type differential transmission apparatus as claimed in claim 2, wherein the sleeve further comprises an engaging groove and the output shaft further comprises an engaging portion, the sleeve sliding on the output shaft by the engaging groove sliding on the engaging portion.

4. The coaxial-type differential transmission apparatus as claimed in claim 2, wherein the shifting device further comprises a clamping member, a fixing member, a sliding member, and an adjusting rod, the clamping member is fixed on the sleeve and comprises a sliding groove, the fixing member is fixed on the base, and the sliding member is slidably disposed in the sliding groove and is connected to the adjusting rod by means of the fixing member.

5. The coaxial-type differential transmission apparatus as claimed in claim 1, wherein the base further comprises a first sidewall and a second sidewall opposite thereto, the fixed gear is fixed on the first sidewall and between the first sidewall and the intermediate member, the input shaft is rotatably fitted in the first sidewall and fixed gear, the output shaft is rotatably fitted in the second sidewall, and the shifting device is disposed on the second sidewall and output shaft.

6. The coaxial-type differential transmission apparatus as claimed in claim 1, wherein the fixed, reduction, acceleration, first, second, and third gears are spur gears.

7. The coaxial-type differential transmission apparatus as claimed in claim 6, wherein the fixed, reduction, acceleration, first, second, and third gears have the same modulus.

8. The coaxial-type differential transmission apparatus as claimed in claim 7, wherein the first and second gears have the same number of teeth, the fixed and reduction gears have the same pitch circle, and the number of teeth of the fixed gear is different from that of the reduction gear by one.

* * * * *